United States Patent [19]

Petersen et al.

[11] 4,130,442

[45] * Dec. 19, 1978

[54] METHOD FOR RENEWING GROUT

[75] Inventors: Arthur W. Petersen, Chatham Township, Morris County; Arthur Cimiluca, Carlstadt; Leonard Hirschberger, Marlboro, all of N.J.

[73] Assignee: Frederick G. Schwarzmann, Kearny, N.J.

[*] Notice: The portion of the term of this patent subsequent to Jun. 7, 1994, has been disclaimed.

[21] Appl. No.: 803,843

[22] Filed: Jun. 6, 1977

[51] Int. Cl.$^2$ .............................................. B08B 7/00
[52] U.S. Cl. ........................................ 134/4; 106/253; 106/308 M; 260/29.6 R; 260/42.21; 427/154
[58] Field of Search .................. 106/308 M; 134/2, 4; 427/154

[56] References Cited

U.S. PATENT DOCUMENTS

| | | | |
|---|---|---|---|
| 3,264,238 | 8/1966 | Wallen | 106/308 M |
| 3,458,804 | 7/1969 | Wolf et al. | 106/308 M |
| 3,600,346 | 8/1971 | Spatola | 106/308 M |
| 3,714,086 | 1/1973 | Schaefer et al. | 106/308 M |
| 3,959,193 | 5/1976 | Putman et al. | 106/308 M |

*Primary Examiner*—Lorenzo B. Hayes
*Attorney, Agent, or Firm*—Hammond & Littell

[57] ABSTRACT

Method for renewal of grout utilizing a composition comprising a surfactant a pigment and a water-soluble or water-dispersible organic binding agent and a method for renewing grout.

5 Claims, No Drawings

METHOD FOR RENEWING GROUT

STATE OF THE ART

A considerable number of products have been developed for cleaning ceramic title and grout and these products usually contain a sequestering agent to assist in the removal of hard water salts and soap scum, a wetting agent to penetrate the soil and in some cases a solvent to remove greasy type residues. In addition, some of the products also contain bactericidal agents to kill germs and control the growth of mold and mildew. The sequestering agents most commonly used are sodium tripolyphosphate or tetrasodium ethylenediaminetetraacetate. The wetting agent may be any of those commonly known and used as such as long as it is compatible with the bactericidal agent used. An extensive list of such agents appears in the publication, *McCutcheon's Detergents & Emulsifiers* 1974 *Annual*. The wetting agents may be anionic, cationic, nonionic or amphoteric. The solvent may be any water-miscible material which has grease removal properties and alcohols and glycol ethers are examples of solvents currently used. The bactericides may be of the phenolic type such as o-phenylphenol, the cationic type represented by quaternary ammonium salts or other commonly known materials which are effective in killing bacteria and molds. Typical products may also contain thickeners (gums) to increase their viscosity and thereby prevent running when they are applied to vertical surfaces.

Generally, such products perform quite well on ceramic title surfaces. However they are not satisfactory in removing the soil from the grout which has a more porous surface and hence holds on to the soils such as soap scum, mold and mildew more tenaciously. Grout by itself also discolors to some extent on aging. Some products have been developed for specific cleaning of the grout, per se and these have been acid based products using either mineral acids (hydrochloric acid, phosphoric acid, etc.) or organic acids (acetic acid, citric acid, etc.) as the active cleaning agent. Although these have been more effective than the tile cleaners described above, they have not been completely satisfactory in removing all the discoloration and in addition, those acids which are most effective, have a tendency to etch the tile.

OBJECTS OF THE INVENTION

It is an object of the invention to provide novel composition for renewing the grout by depositing a pigmented film in the grout which gives the grout a new clean appearance.

It is a further object of the invention to provide a novel method for renewing grout.

These and other objects and advantages of the invention will become obvious from the following detailed description.

THE INVENTION

The novel compositions of the invention for the renewing of grout are comprised of a surfactant, a pigment and a water-soluble or water-dispersible organic binding agent. The compositions may be liquid dispersions up to pastes.

The compositions can be used by applying the compositions to the grout, preferably with a brush. A damp sponge or rag may also be used. When the composition drys, the the residue on the tile is readily removed with a dry paper towel or rag. The film will remain in the grout even after many showers in which water is directly sprayed on the film. Moreover, even if the renewer remains on the porcelain tile overnight, it is readily removed by washing with water. The renewer may also be applied by other mechanical means such as spraying or by an applicator to accomplish restoration of the grout.

The surfactant causes the restorer to spread evenly over the soiled surfaces, and assists in the rinsing of the composition from the tile. The surfactant may be any known type such as anionic, cationic, nonionic or amphoteric with the specific type usually being determined by its compatibility with the other ingredients in the composition particularly the emulsifier used to form the dispersion of the binder. An emulsion prepared with a cationic emulsifier will require a cationic, nonionic or amphoteric surfactant. If the emulsion is prepared with a nonionic emulsifier, nonionic, cationic or anionic surfactants are compatible therewith. Emulsions with an anionic emulsifier will be compatible with an anionic or nonionic surfactant.

Extensive lists of suitable surfactant are disclosed in the publication McCutcheon's Detergents & Emulsifiers, 1974 Annual. The agents can be anionic, cationic, nonionic, or amphoteric and should be compatible with the other ingredients and impart the desired surface active properties.

Examples of anionic surfactants include (A) carboxylic acids such as soaps of straight chained naturally occuring fatty acids, chain-substituted derivatives of fatty acids, branched-chain and odd-carbon fatty acids, acids from paraffin oxidation, and carboxylic acids with intermediate linkages; (B) sulfuric esters such as sodium lauryl sulfate, tallow alcohol sulfates and coconut alcohol sulfates.

Examples of cationic surfactants include (A) non-quaternary nitrogen bases such as amines without intermediate linkages, and (B) quaternary nitrogen bases of the formula

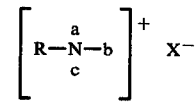

wherein R is straight-chain alkyl of 12 to 19 carbon atoms, wherein a, b and c are methyl, ethyl or benzyl (usually not more than one benzyl group being present), and wherein X is halide such as chloride, bromide or iodide, methylsulfate or ethylsulfate and quaternary ammonium salts such as Hyamine 10X (diisobutyl-cresoxy ethoxyethyl dimethylbenzyl ammonium chloride monohydrate).

Examples of nonionic surfactants include polyethyleneoxy ethers of alkylphenols, alkanols, mercaptans, esters as well as polyethyleneoxy compounds with amide links.

The pigments in the composition are water-insoluble materials which provide opacity to the film of the binding agent and may also be colored. Titanium dioxide, zinc oxide, talc, silica or calcium carbonate are pigments imparting a white color to the film. Carbon black is used for a black film and ultramarine blue is used for a blue film. Other pigments can be used to obtain films of other colors.

To obtain compositions of the desired consistency, any thickening agent compatible with the system may be added thereto. Some useful organic agents are starch, sodium carboxymethycellulose, hydroxyethyl, cellulose, methocel, and water-soluble polymers such as carboxy vinyl polymer (Carbopols from B. F. Goodrich Chemical Company) and are Xanthan gums. Inorganic colloidal materials such as Veegum (magnesium aluminum silicates manufactured by R. T. Vanderbilt) are also effective.

The composition may also contain a anaterial to control the growth of mold and mildew. This material may be of the phenolic type such as o-phenylphenol, the cationic type represented by quaternary ammonium salts, or other commonly known materials which are effective against these organisms.

The water-soluble or water-dispersible binding agent may be any polymer or copolymer which will dry to form water-insoluble films and they are well known to those skilled in the art. The binding agents include polyethylene polymers, polystyrene polymers, polyacrylate polymers, modified acrylate polymers including metal cross-linked acrylate polymers, polyether derivative of chemically modified linseed oil. The said polymers are frequently sold commercially as aqueous emulsions but some are also available in water-soluble forms. Others are available as the solid polymer. These can be made into dispersions by anyone skilled in the art. Examples of suitable binding agents are set forth in the following Table.

TABLE

| Polymer Type | Trade Names | Emulsifier Used |
|---|---|---|
| Polyethylene | Polyethylene AC629[1] | Anionic Cationic Nonionic |
| Acrylic | Rhoplex LC-40[1] | Anionic |
|  | Rhoplex B-505[1] | Anionic |
|  | Rhoplex B-74[1] | Anionic |
|  | Rhoplex AC-388[1] | Anionic |
|  | Rhoplex B-60A[1] | Nonionic |
| Metal Cross-linked Acrylic Emulsion | Rhoplex-505[1] | Anionic |
| Polyvinyl Acetate | Vinac 881[1] | Anionic |
| Vinyl-Acrylic Co-Polymer | Flexbond 315[1] | Anionic |
| Polyvinyl Maleic Anhydride Copolymers | Gantrez AN169 |  |
| Acrylate Salt Solutions | Carboset 514 |  |
| Acrylate - 100% Liquid Resin | Carboset 515 |  |
| Polyether derivative of chemically-modified linseed oil | Linaqua |  |
| Polyethylene-Organic acid Copolymer | AC-540 | Anionic Nonionic Cationic |
| (1) - Sold as emulsions |  |  |

The Carboset 514 is an example of a water insoluble polymer whose ammonium salt is soluble in water. When the ammonium salt is used in the product and the product is applied as directed and allowed to dry on the grout, the ammonia evaporates and the polymer reverts to its water insoluble form resulting in the formation of a water insoluble film. One of the preferred binding agents for use in the composition is Rhoplex 505. This material is a zinc-cross-linked all acrylic-copolymer. On drying the zinc complexes with the carboxylic acid groups on the copolymer giving a water resistant film. The binding agent in the composition is responsible for adherence of the pigment. Polyethylene AC 629 (nonionic, anionic, cationic types), Rhoplex LC-40 and Flexbond 315 are emulsions which dry to water-resistant films.

The compositions may also contain suspending agents to prevent the pigments from precipitating from the composition. The preferred suspending agent is hydroxyethylcellulose although other suspending agents are suitable such as ethylene oxide polymers, magnesium aluminum silicate, pyrogenic silica, xanthan gums and sodium carboxymethyl cellulose. The compositions may contain 0.5 to 10% by weight, preferably 1 to 5% by weight, of the suspending agent.

The compositions may also contain other ingredients to modify the film of the binding agent such as plasticizers and coalescent agents such as dibutylphthalate and methylcarbitol to reduce the film brittleness. The compositions may also contain small amounts of drying agents such as lead naphthenate, cobalt naphthenate and manganese octoate and manganese naphthenate to aid the cure of the film of the binding agent.

The compositions of the invention may be preferably contain 0.01 to 10% by weight of the surfactant on a dry basis. The compositions may contain from 10 to 60% by weight on a dry basis of the binding agent and the pigment, preferably 15 to 20% by weight. The ratio of binding agent or resin to pigment may be from 1:5 to 5:1, preferably 1:3 to 3:1.

In the following examples there are described several preferred embodiments to illustrate the invention. However, it is to be understood that the invention is not intended to be limited to the specific embodiments.

EXAMPLES 1 to 4

The compositions of Table I were prepared by dispersing the materials in the appropriate amount of water. The compositions were applied to the grout with a brush. The compositions were allowed to dry for two hours and the excess material was removed from the tile with a dry cloth. However, even if the excess material remains on the tile overnight it can still be removed with a damp sponge.

TABLE I

| Components | % By Weight | | | |
|---|---|---|---|---|
|  | Ex. 1 | Ex. 2 | Ex. 3 | Ex. 4 |
| Polyethylene-emulsion [cationic type] 25% solids [AC 629] | 25.0 | — | — | — |
| Polyethylene-emulsion [nonionic type] 40% solids [AC 629] | — | 15.6 | — | — |
| Acrylic acid polymer emulsion [anionic type] 55% solids [Rhoplex-LC 40] | — | — | 11.4 | — |
| Vinyl-acrylic copolymer-emulsion [anionic type] 50% solids [Flexbond 315] | — | — | — | 11.2 |
| titanium dioxide-pigment | 10.0 | 10.0 | 10.0 | 10.0 |
| hydroxyethyl cellulose [Natrasol 250H] | 0.7 | 0.4 | 0.4 | 0.4 |
| Polyethylene glycol ether of a linear alcohol [Tergitol 15-S-9] | 0.2 | 0.2 | 0.2 | 0.2 |
| N-alkyldimethylbenzyl ammonium chloride (40% $C_{12}$, 50% $C_{14}$, 10% $C_{16}$) [Hyamine 3500] | 0.2 | — | — | — |
| Sodium salt of o-phenyl-phenol [Dowicide A] | — | 0.6 | 0.3 | 0.3 |
| Water | 63.9 | 73.2 | 77.7 | 77.9 |

The said compositions all contain 10% by weight of titanium dioxide and all also contain a bactericide. The wetting agent, Tergitol 15-S-9, is of the nonionic type.

All the compositions were useful for renewing the appearance of the grout.

EXAMPLES 5-6

The compositions of Table II were prepared as in Table I and the compositions are representative of resins used to prepare a water resistant film on the grout. The resin binding agent is a base soluble, metal cross-linked acrylic polymer and the dibutylphthalate (plasticizer) and methylcarbitol (coalescing agent) are added to reduce the brittleness of the film formed after drying.

TABLE II

| Component | % By Weight | |
|---|---|---|
| | Ex. 5 | Ex. 6 |
| Rhoplex 505 - Acrylic polymer emulsion [anionic emulsifier] - 40% solids | 13.0 | 20.0 |
| Methyl carbitol | 3.4 | 5.3 |
| FC-128, 0.5% solution [fluorochemical surfactant] | 0.5 | 0.8 |
| Dibutyl phthalate | 0.8 | 1.3 |
| Suspending agent - hydroxyethyl cellulose | 0.5 | 0.5 |
| Pigment - titanium dioxide | 10.0 | 10.0 |
| Water | 71.8 | 62.1 |
| | 100.0 | 100.0 |

EXAMPLES 7-9

The compositions of Table III were prepared as in Table I and the binding agent is Linaqua which is a polyether derivative of chemically modified linseed oil and volatile coupling agents which evaporate on drying. The pigmented film is deposited on the grout which is water-resistant which thereby renews the appearance of the grout. Lead naphthenate, cobalt naphthenate and manganese octoate are drying agents added to cure the binding agent.

TABLE III

| Components | % By Weight | | |
|---|---|---|---|
| | Ex. 7 | Ex. 8 | Ex. 9 |
| Linaqua, 85% active | 12.00 | 12.00 | 6.00 |
| Lead naphthenate (24% Pb) | 0.26 | 0.26 | 0.13 |
| Cobalt naphthenate (6% Co) | 0.10 | 0.10 | 0.05 |
| Manganese octoate (6% Mn) | 0.03 | 0.03 | 0.02 |
| Pigment - titanium dioxide | 24.00 | 12.00 | 12.00 |
| Suspending agent Ben-A-Gel-hydrate magnesium silicate | 2.10 | 3.00 | 3.50 |
| Tergitol 15-S-9 | 0.05 | 0.05 | 0.05 |
| Water | 61.46 | 72.56 | 78.25 |

EXAMPLES 10 TO 15

The compositions of Table IV were prepared as in Table I and the resulting compositions had a good shelf life. Although some settling of the pigment was observed with some of the compositions, the pigment was readily dispersed on shaking the samples.

TABLE IV

| Component | Ext. 10 | Ex. 11 | Ex. 12 | Ex. 13 | Ex. 14 | Ex. 15 |
|---|---|---|---|---|---|---|
| Tergitol 15-S-9 | 0.2 | 0.2 | 0.2 | 0.2 | 0.2 | 0.2 |
| Dowicide A (sodium salt of o-phenylphenol) | 0.1 | 0.1 | 0.1 | 0.1 | 0.1 | 0.1 |
| Polyox WSRN 205 (ethylene oxide polymer) | | | 2.0 | | | |
| Natrasol | | 0.8 | | | | |
| Veegum K (magnesium aluminum silicate) | 4.0 | | | | | |
| Cabosil M (pyrogenic silica) | | | | 4.0 | | |
| CMC 7H (sodium carboxymethyl cellulose) | | | | | 1.0 | |
| Kelzan (xanthan) | | | | | | 1.0 |
| AC-392 (polyethylene as 30% solids emulsion with a cationic emulsifier) | 5.0 | 5.0 | 5.0 | 5.0 | 5.0 | 5.0 |
| Titanium dioxide | 10.0 | 10.0 | 10.0 | 10.0 | 10.0 | 10.0 |
| Water | 80.7 | 83.9 | 82.7 | 80.7 | 83.7 | 83.7 |

Various modifications of the composition and method of the invention may be made without departing from the spirit or scope thereof and it should be understood that the invention is to be limited only as defined in the appended claims.

We claim:

1. The method of renewing the surface of grout comprising applying a composition consisting essentially of an aqueous suspension of 0.1 to 10% by weight of a surfactant, 10 to 60% by weight on a dry basis of a water-soluble or water-dispersible organic binder which dries to a water resistant film and a pigment, the weight ratio of binding agent to pigment being 1:5 to 5:1 to the grout, allowing the composition to dry to form a water resistant film of the organic binding agent on the grout and removing excess composition from the tile.

2. The method of claim 1 wherein the composition also contains a bactericide.

3. The method of claim 1 wherein the composition also contains 0.5 to 10% by weight of a suspending agent for the pigment.

4. The method of claim 1 wherein the pigment is selected from the group consisting of titanium dioxide, zinc oxide, talc, silica, calcium carbonate, carbon black and ultramarine blue.

5. The method of claim 1 wherein the surfactant is selected from the group consisting of anionic, cationic, nonionic and amphoteric surfactants.

* * * * *